(12) United States Patent
Hermann

(10) Patent No.: US 7,928,829 B2
(45) Date of Patent: Apr. 19, 2011

(54) METHOD FOR CONTROLLING ACCESS TO A VEHICLE

(75) Inventor: Stefan Hermann, Köfering (DE)

(73) Assignee: Continental Automotive GmbH, Hannover (DE)

( * ) Notice: Subject to any disclaimer, the term of this patent is extended or adjusted under 35 U.S.C. 154(b) by 876 days.

(21) Appl. No.: 11/851,268

(22) Filed: Sep. 6, 2007

(65) Prior Publication Data

US 2008/0061931 A1   Mar. 13, 2008

(30) Foreign Application Priority Data

Sep. 13, 2006   (DE) .......................... 10 2006 042 974

(51) Int. Cl.
*B60R 25/00*   (2006.01)
(52) U.S. Cl. ........................... 340/5.72; 340/5.2; 340/5.8
(58) Field of Classification Search ................. 340/5.72, 340/5.61, 5.2, 5.8, 539.21, 539.23
See application file for complete search history.

(56) References Cited

U.S. PATENT DOCUMENTS

| | | | | |
|---|---|---|---|---|
| 5,723,911 A | 3/1998 | Glehr | ............................. | 307/10.2 |
| 6,218,932 B1 | 4/2001 | Stippler | ........................ | 340/426 |
| 6,359,348 B1 * | 3/2002 | King | .............................. | 307/10.1 |
| 6,437,683 B1 | 8/2002 | Wolf et al. | .................... | 340/5.61 |
| 6,441,512 B1 * | 8/2002 | Jakel et al. | ..................... | 307/10.2 |
| 6,617,961 B1 * | 9/2003 | Janssen et al. | ................... | 340/5.8 |
| 6,670,883 B1 * | 12/2003 | Asakura et al. | ............... | 340/5.61 |
| 6,924,738 B2 | 8/2005 | Emmerling et al. | ........... | 340/505 |
| 6,950,008 B2 | 9/2005 | Hagl et al. | .................... | 340/5.61 |
| 6,963,268 B2 | 11/2005 | Brillon | .......................... | 340/5.72 |
| 6,998,958 B2 | 2/2006 | Asakura et al. | ............... | 340/5.61 |
| 7,301,467 B2 * | 11/2007 | Ishimura et al. | .............. | 340/644 |
| 2002/0027498 A1 | 3/2002 | Stephane | .................... | 340/425.5 |
| 2005/0285724 A1 | 12/2005 | Schmidt et al. | ........... | 340/426.16 |
| 2006/0214768 A1 | 9/2006 | Hermann | ..................... | 340/5.61 |

FOREIGN PATENT DOCUMENTS

| | | |
|---|---|---|
| DE | 4409167 | 3/1994 |
| DE | 19826904 | 6/1998 |
| DE | 19836957 | 8/1998 |
| DE | 19845649 | 10/1998 |
| DE | 19900415 | 1/1999 |
| DE | 10064141 | 12/2000 |
| DE | 19941849 A1 | 4/2001 |
| DE | 10202330 | 1/2002 |
| DE | 10221427 | 5/2002 |
| DE | 10064441 A1 | 6/2002 |
| DE | 10148830 | 4/2003 |
| DE | 10353589 A1 | 6/2004 |
| DE | 102004039835 | 8/2004 |
| DE | 10334624 A1 | 3/2005 |
| DE | 102004036920 A1 | 3/2005 |

(Continued)

*Primary Examiner* — Vernal U Brown
(74) *Attorney, Agent, or Firm* — King & Spalding L.L.P.

(57) ABSTRACT

In a method for controlling access to a vehicle (FZ), first an authentication signal is sent from the vehicle to an authorized mobile ID transmitter (IDG), with which authentication signal the ID transmitter is authorized to unlock the vehicle. Subsequently, the distance from the valid authorized mobile ID transmitter to the vehicle is determined. Finally, an unlock signal (ES) is transmitted from the valid authorized mobile ID transmitter to the vehicle, if the distance from the ID transmitter to the vehicle is less than a predetermined first proximity distance (ANRE). In this way an efficient control of access to a vehicle is achieved, wherein the mobile ID transmitter automatically unlocks the vehicle when a certain proximity to the vehicle is identified.

13 Claims, 3 Drawing Sheets

FOREIGN PATENT DOCUMENTS

| | | |
|---|---|---|
| DE | 102005032402 | 7/2005 |
| DE | 60013201 T2 | 9/2005 |
| DE | 102005013008 A1 | 10/2005 |
| DE | 102005028677 | 12/2005 |
| DE | 102005013910 | 3/2006 |
| EP | 1510835 | 8/2004 |

* cited by examiner

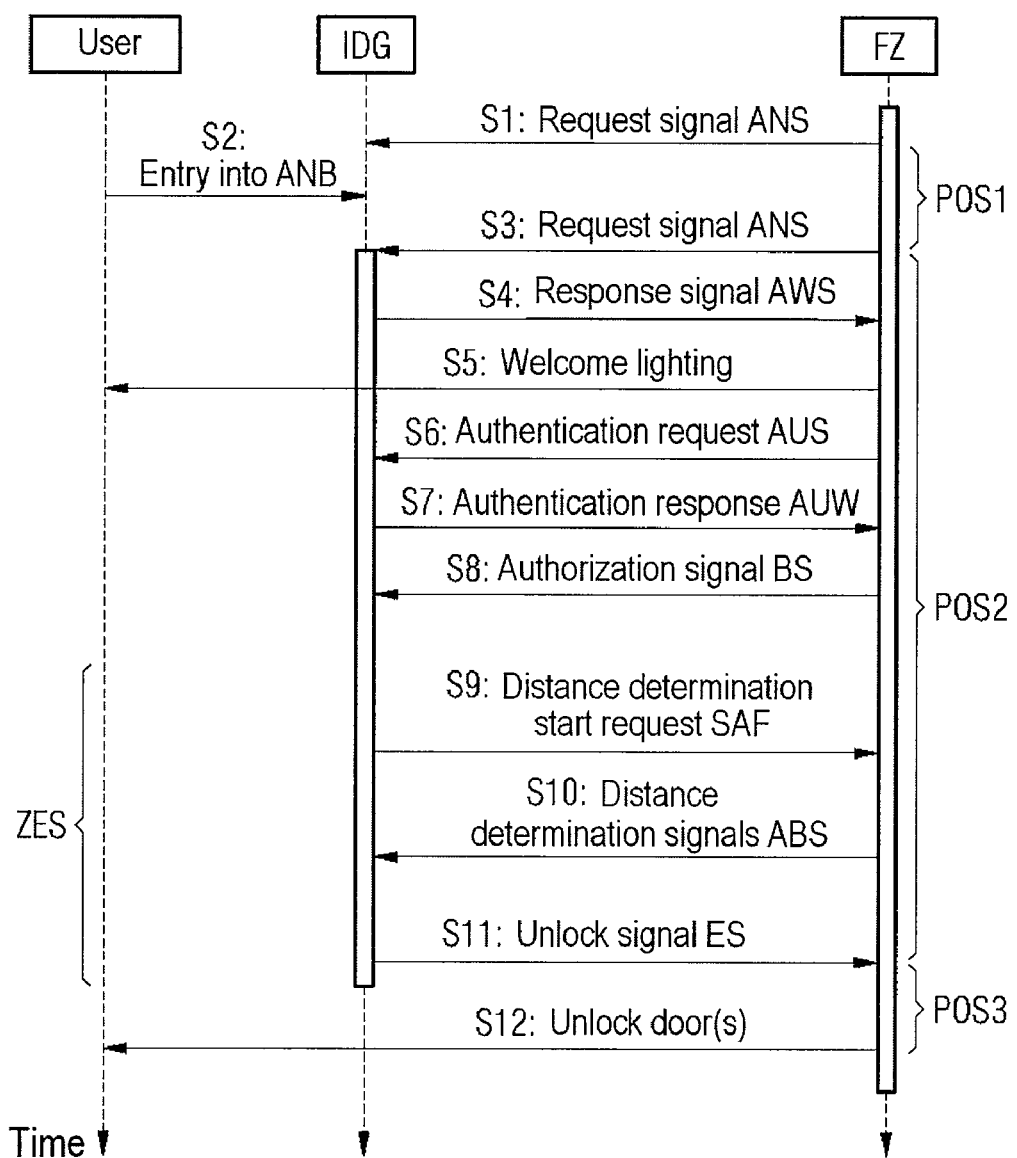

METHOD FOR CONTROLLING ACCESS TO A VEHICLE

CROSS-REFERENCE TO RELATED APPLICATIONS

This application claims priority to German Patent Application Number 10 2006 042 974.5 filed on Sep. 13, 2006, and which is incorporated herein by reference in its entirety.

TECHNICAL FIELD

The invention relates to a method for controlling access to a vehicle as well as an access system for a vehicle.

BACKGROUND

To prevent unauthorized access to a vehicle, in particular a car, modern access authorization systems or access systems in vehicles use electronic security systems, wherein, to authenticate a user, data communication is made between a first communication device of the vehicle and a second communication device in a mobile ID transmitter of the user, such as a key or key fob. To this end, initially request signals having a specific field strength are emitted at regular intervals by the first communication device of the vehicle, in order to check whether there is a mobile ID transmitter in a proximity area around the vehicle. If a mobile ID transmitter approaches the vehicle and can then receive the request signals of said vehicle, then it will respond to the reception of a request signal in order to initiate an authentication procedure or a pre-authentication procedure. Thereby there is an exchange of data telegrams in which finally the mobile ID transmitter transmits its authentication code to the vehicle. When the checking of the authentication code is successful, it is then possible for a user who is directly beside the vehicle to trigger the unlocking of a corresponding vehicle door or all vehicle doors by operating a door handle. Usually, after the door handle has been operated, another authentication is carried out between the vehicle and the ID transmitter, whereby the at least one door of the vehicle is only unlocked after the second authentication has been successfully performed. As in this case a user does not have to actively operate a mechanical or electronic key, this kind of access authorization is also called passive access authorization check, and the corresponding access authorization systems are called passive electronic access authorization systems.

Disadvantageous in a method of this kind for attaining access to a vehicle has proved to be that a user who is at the vehicle has first to operate a door handle to achieve access into the vehicle and further must await the additional authentication. This can be particularly awkward if a user has just returned to the vehicle after shopping and is laden with shopping.

SUMMARY

A more efficient way and more comfortable way for the user to access a vehicle can be created by an embodiment of a method for controlling access to a vehicle, which may comprise the following steps of: Sending an authentication signal from the vehicle to an authorized mobile ID transmitter, with which signal the ID transmitter is authorized to unlock the vehicle; Determining the distance from the valid authorized mobile ID transmitter to the vehicle; and Transmitting an unlock signal from the valid authorized mobile ID transmitter to the vehicle, if the distance from the ID transmitter to the vehicle falls below a predetermined first proximity distance.

According to an enhancement, the vehicle may emit one or several request signals before emitting the authentication signal, in order to check whether a mobile ID transmitter is located within a second proximity distance that is greater than the first proximity distance. According to a further enhancement, the vehicle, in the event of the check being successful, may emit a confirmation signal of the successful check to a user carrying the mobile ID transmitter. According to a further enhancement, According to a further enhancement, the vehicle, in the event of the check being successful, may conduct an authentication procedure with the detected ID transmitter in order to determine its authorization to unlock the vehicle. According to a further enhancement, in the event that the authorization is successfully determined, the authentication signal can be sent directly to the mobile ID transmitter. According to a further enhancement, in order to determine the distance from the authorized valid mobile ID transmitter to the vehicle the vehicle may emit one or several distance determining signals with a predetermined field strength, and on receiving said signals, the valid, authorized mobile ID transmitter can determine the distance to the vehicle. According to a further enhancement, after the authentication signal has been sent, a predetermined unlock time interval within which the unlock signal can be transmitted, begins to be counted down. According to a further enhancement, after the predetermined unlock time interval has expired, the unlock signal can be classed as invalid by the vehicle.

According to a further embodiment, an access system for a vehicle, may comprise a send/receive device on the vehicle for sending an authentication signal to an authorized mobile ID transmitter, through which signal the ID transmitter is authorized to unlock the vehicle; a mobile ID transmitter comprising: a send/receive device on the ID transmitter for receiving the authentication signal; a distance determining device for determining the distance between the mobile ID transmitter and the corresponding vehicle; wherein the send/receive device on the ID transmitter is further equipped to transmit an unlock signal to the vehicle, after it has received the authentication signal and a distance less than a first predetermined proximity distance has been determined.

According to an enhancement, the send/receive device on the vehicle can be designed to emit one or several request signals before sending the authentication signal in order to check whether a mobile ID transmitter is located within a second proximity distance that is greater than the first proximity distance. According to a further enhancement, the send/receive device on the ID transmitter can be designed to transmit a response signal after receiving a request signal of the send/receive device on the vehicle to initiate an authentication procedure of the mobile ID transmitter. According to a further enhancement, after successful authentication, the send/receive device on the vehicle may send the authentication signal to the mobile ID transmitter. According to a further enhancement, the send/receive device on the vehicle may emit one or several signals with predetermined field strength for a distance determination, using which signals the distance determining device of the mobile ID transmitter can determine the distance to the vehicle. According to a further enhancement, the system may have in addition a control device on the vehicle, to which device the send/receive device on the vehicle routes a received unlock signal, so that the control device on the vehicle unlocks at least one door of the vehicle. According to a further enhancement, after sending the authentication signal, the control device on the vehicle can be designed to measure a predetermined unlock time interval within which the receipt of the unlock signal is accepted.

BRIEF DESCRIPTION OF THE DRAWINGS

In the following the aim is, referring to the attached drawings, to explain in greater detail exemplary embodiments of this invention. Shown are:

FIG. 3 a flow chart to illustrate the operation of an access system for controlling access to a vehicle according to an embodiment.

DETAILED DESCRIPTION

Figure 1:
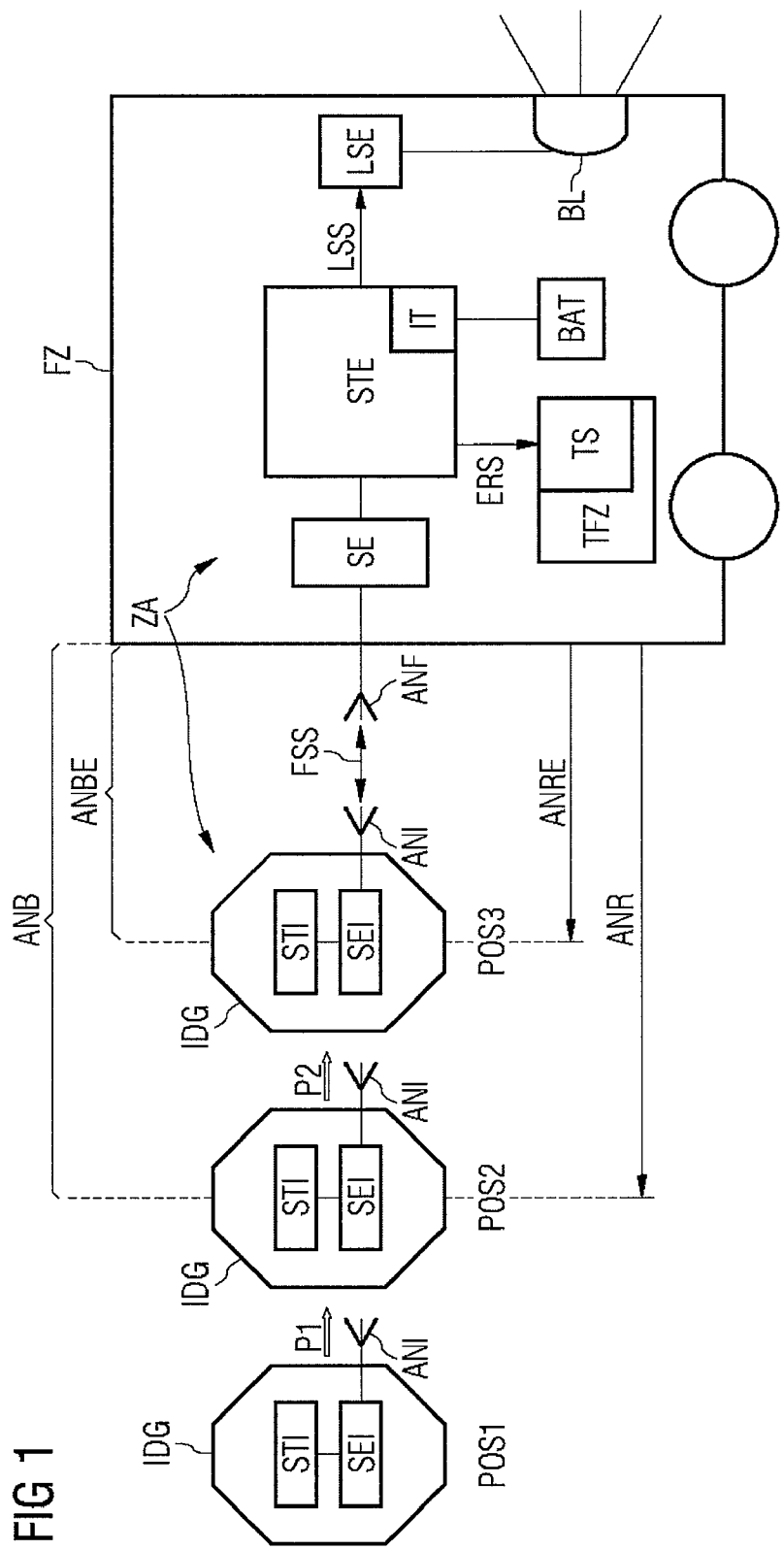
FIG. 1 a schematic drawing of a keyless electronic access authorization system or of an access system in a vehicle in accordance with an embodiment.

According to an embodiment, a method for controlling access to a vehicle, in particular a car, may comprise the following steps. An authentication signal is sent from the vehicle to an authorized mobile ID transmitter, for example in the form of a key or key fob, with which the ID transmitter is authorized to unlock the vehicle. Further the distance from the valid authorized mobile ID transmitter to the vehicle is determined. Finally an unlock signal or open signal (e.g. to open the boot lid) is transmitted from the valid authorized mobile ID transmitter to the vehicle, if distance from the ID transmitter to the vehicle falls below a predetermined first proximity distance. That means that if a user with his (authorized) valid mobile ID transmitter is at a certain distance, for example from 0.5 to 0.75 m (m: meter) from the vehicle, the ID transmitter itself triggers the unlock signal, whereby there still remains time for possible checking of the unlock signal and subsequent unlocking of at least one vehicle door, before the user (with his mobile ID transmitter) has covered the stretch of the predetermined first proximity distance. In this way efficient control of access is attained where a user gains access to the vehicle without being aware of the authentication processes between the mobile ID transmitter and the vehicle.

According to an embodiment, the vehicle will emit one or several request signals before emitting the authentication signals to check whether there is a mobile ID transmitter within a predetermined second proximity distance that is greater than the predetermined first proximity distance. The request signals are thus calculated so that a mobile ID transmitter is already identified at an early point in time so that a communication link can be established with said ID transmitter. The predetermined second proximity distance can be around 1 to 1.5 m.

If there is a mobile ID transmitter within the predetermined second proximity distance, then said ID transmitter can respond to one of the request signals of the vehicle, by which means the vehicle then conducts an authentication procedure with the detected ID transmitter in order to determine its authorization to unlock the vehicle. In this authentication procedure or pre-authentication procedure, one or several data telegrams are transmitted between the vehicle and the mobile ID transmitter, whereby finally the ID transmitter transmits its authentication code to the vehicle. If the authentication code of the mobile ID transmitter is classified as valid by the vehicle, then, advantageously, as result of a successful authentication, the vehicle can then immediately send the authentication signal to the now authorized or authenticated mobile ID transmitter.

So that the valid, authorized mobile ID transmitter knows when it should send the unlock signal to the vehicle, according to an embodiment, one or several signals (distance determining signals) with a predetermined field strength are emitted by the vehicle in order to determine the distance to the vehicle. Based on the reception of these signals, the mobile ID transmitter can determine the distance to the vehicle. That means that by knowing the predetermined field strength with which the vehicle emits the signals, and after measuring the field strength of the respective distance determining signals at the location of the mobile ID transmitter, the mobile ID transmitter can determine the distance to the vehicle. Thereby for the distance determination an RSSI (RSSI: Received Signal Strength Indication) value can be specified.

To improve security and also to reduce power consumption (if the distance determining signals are to be emitted by the vehicle at regular intervals) it is conceivable that after the authentication signal has been emitted, count down is started for a predetermined unlock time interval, within which the unlock signal must be transmitted. If the unlock time interval has expired, then a received unlock signal can be classified by the vehicle as no longer valid or, for example, the emission of the distance determining signals can be aborted so that a distance determination is no longer possible for the mobile ID transmitter and hence an unlock signal will not be transmitted either.

Further, according to a second aspect, an access system for a vehicle, in particular a car, is designed, which has the following features. Said access system has a send/receive device on the vehicle for sending an authentication signal to an authorized mobile ID transmitter (for example in the form of a key or key fob), through which the ID transmitter is authorized to unlock the vehicle or one specific door or all doors. In addition, the access system comprises an (authorized) mobile ID transmitter, which has a send/receive device on the ID transmitter for receiving the authentication signal, and also a distance determining device for determining the distance between the mobile ID transmitter and the corresponding vehicle. Thereby the send/receive device on the ID transmitter is further equipped to transmit an unlock signal to the vehicle, after it has received the authentication signal and when the distance determined is less that a predetermined first proximity distance. In this way an efficient access system is realized where the send/receive device on the ID transmitter automatically emits an unlock signal when the distance is below a minimum distance from the vehicle, whereby sufficient time remains for any checking of the unlock signal (namely until the user assigned to the ID transmitter has reached the vehicle, and has, for example, operated a door handle to get into the vehicle).

According to an embodiment, the send/receive device on the vehicle is in addition designed to emit one or several request signals before it sends the authentication signal, in order to check whether there is a mobile ID transmitter within a second proximity distance that is greater than the first proximity distance. In addition, the mobile ID transmitter or its send/receive device can be designed to transmit a response signal after it has received a request signal from the send/receive device on the vehicle, in order to initiate an authentication procedure of the mobile ID transmitter at the vehicle. Thereby, after a successful authentication, the send/receive device on the vehicle can send the authentication signal (as a result of a successful authentication) to the mobile ID transmitter.

In order for the mobile ID transmitter or its distance determining device to be able to determine the distance to the vehicle, according to an embodiment of the access system the send/receive device on the vehicle emits one or several signals (distance determining signals) with a predetermined field strength, using which signals the distance determining device of the mobile ID transmitter can determine the distance to the vehicle. Using the known predetermined field strength of the distance determining signals at their emission and also using the field strength of the distance determining signals measured at the location of the mobile ID transmitter, the distance determining device can thus judge how far the mobile ID transmitter is from the vehicle.

According to a further embodiment, the access system has a control device on the vehicle, to which control device the send/receive device on the vehicle routes a received unlock signal, so that the control system on the vehicle can trigger the unlocking of at least one door of the vehicle. Thereby the control device can trigger the unlocking of a specific door or of all the doors of the vehicle, for example by activating a central locking system.

According to a further embodiment, the control device on the vehicle is designed so that, after the authentication signal has been emitted by the send/receive device on the vehicle, it measures a predetermined unlock time interval, within which reception of the unlock signal is possible or is accepted. Thereby, after the predetermined unlock time interval has expired, the control device on the vehicle can no longer accept an incoming unlock signal (without further authentication) or said control device can control the send/receive device on the vehicle in such a way that said send/receive device stops emitting the distance determining signals.

According to a further aspect, a car is designed with an access system as described above including the embodiment of said access system.

Embodiments of the above illustrated method are, in as far as they are otherwise transferable to the system or the car, also to be regarded as embodiments of the system or the car.

First reference is made to FIG. 1, in which an access authorization system or an access system ZA is shown, which is designed for use in a vehicle, here in the car FZ. Thereby the access system ZA comprises (in an area on the vehicle, compare right side of FIG. 1) a control device STE on the vehicle, which device is supplied with power by a battery BAT. Although it is not represented, the battery BAT also supplies the other components of the vehicle with power. The control device STE is connected to a send/receive device SE on the vehicle, which device is able, by means of an antenna ANF on the vehicle, to communicate with a mobile ID transmitter IDG (which will be explained in more detail later) via a radio link FSS. Further the control device STE is connected to a door lock TS (which can, for example, represent a central locking system), in order to activate the door lock by means of an unlock command ERS. In addition, the control device STE is connected to a light control device LSE, whereby after it receives a light control signal LSS, the light control device LSE is able to activate or to deactivate a lighting device BL, here, for example, in the form of an indicator or dipped headlights.

As has been described above, the vehicle FZ will communicate with a mobile ID transmitter IDG (in an area on the ID transmitter, compare left side of FIG. 1) via the radio link FSS. The prerequisite for this is that the mobile ID transmitter IDG is in a proximity area ANB, in which the signals emitted by the antenna ANF on the vehicle still have sufficient field strength to be duly received by the mobile ID transmitter IDG. For the reception of signals from the antenna ANF on the vehicle, the mobile ID transmitter IDG has an antenna ANI on the ID transmitter, which antenna is connected to a send/receive device SEI on the ID transmitter, in order to process the signals received or to generate new signals that can then be emitted via the antenna ANI. A control device STI on the ID transmitter is connected to the send/receive device on the ID transmitter and said control device STI is responsible for carrying out an authentication procedure with the vehicle FZ, but can also be used as a distance determining device to determine a distance from the mobile ID transmitter IDG to the vehicle, as will be explained in greater detail below.

As will be further explained later, the mobile ID transmitter IDG in FIG. 1 is shown in three different positions POS1, POS2 and POS3. In the first position POS1 the mobile ID transmitter is still outside the proximity area ANB and does not communicate with the vehicle FZ via the radio link FSS. However, if the mobile ID transmitter IDG along with its user or the car user moves along the arrow P1 toward the vehicle FZ, then it comes to the second position POS2, where it is located in the proximity area ANB, in order to make contact with the vehicle FZ or to respond to request signals of the vehicle. If the mobile ID transmitter IDG then moves along the arrow P2 further toward the vehicle, then it will come into a further proximity area ANBE in which it can send an unlock signal for the vehicle or the door lock TS.

Figure 2:
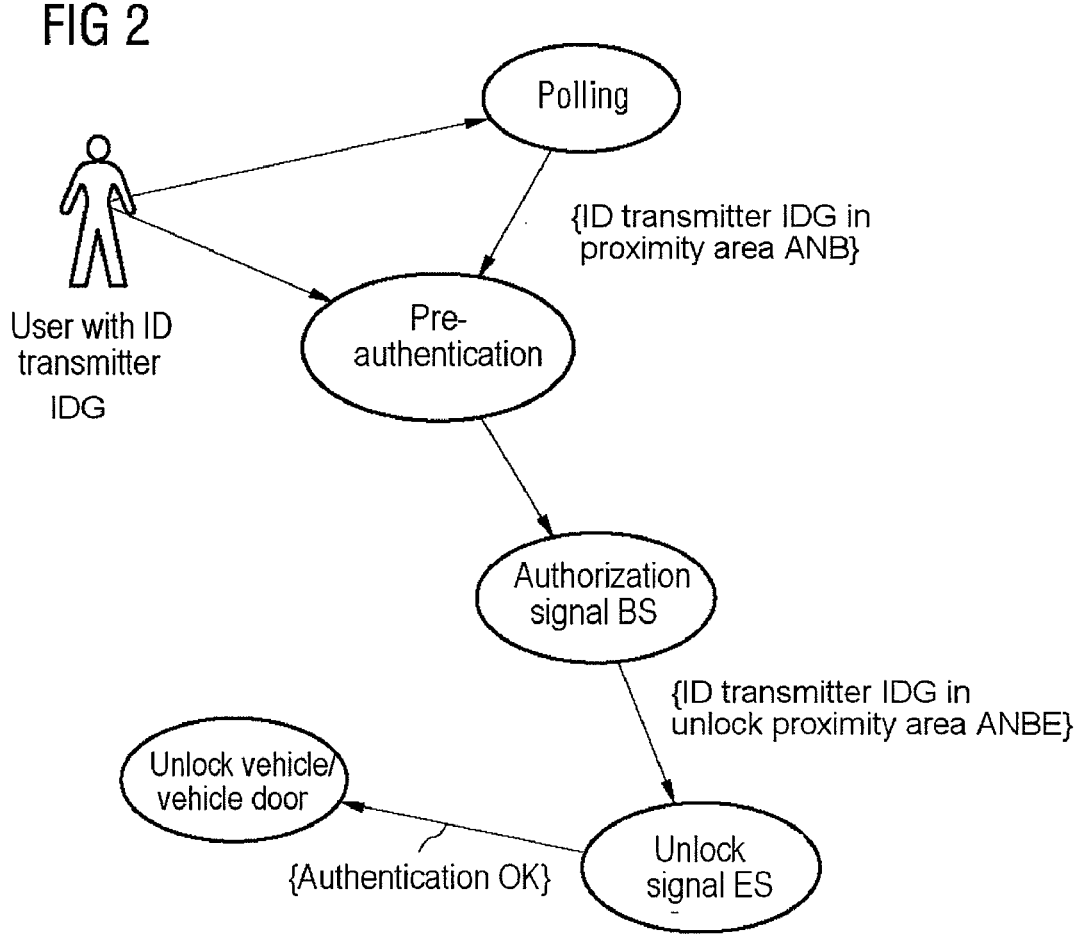
FIG. 2 a schematic drawing to illustrate the states or conditions for controlling access to a vehicle according to an embodiment.

Let us refer now to FIG. 2, which shows a schematic drawing to illustrate the states or conditions for controlling access according to an embodiment. The initial state in FIG. 2 is that a vehicle, such as the vehicle FZ, conducts a so-called "polling" at certain points in time whereby the vehicle emits request signals via the antenna on the vehicle, to which signals a mobile ID transmitter located in the proximity area ANB can respond. First it is presumed that the mobile ID transmitter IDG is still located outside the proximity area (for example in the first position POS1 in FIG. 1). If the mobile ID transmitter IDG approaches the vehicle and is located within the proximity area ANB (for example in the second position POS2) then a pre-authentication is performed, in which data telegrams are exchanged between the vehicle FZ and the mobile ID transmitter IDG via the radio interface FSS, whereby the mobile ID transmitter IDG transmits its authentication code to the vehicle FZ. If the identification code is correct or if the mobile ID transmitter IDG is determined as assigned to the vehicle FZ, then an authorization process takes place in which the vehicle FZ transmits an authentication signal BS to the mobile ID transmitter IDG, through which the mobile ID transmitter is authorized or enabled to unlock the vehicle. The mobile ID transmitter IDG will now check the distance to the vehicle FZ at regular intervals (compare also FIG. 3) and when it is located in the unlock proximity area ANBE or its distance to the vehicle is less than or equal to the distance ANRE, will send an unlock signal ES to the vehicle. After the unlock signal ES has been received by the antenna ANF or the send/receive device SE on the vehicle, the signal is routed to the control device STE, which, for example by means of an ID transmitter identifier attached to the unlock signal or a further authentication procedure, then checks the authorization of the mobile ID transmitter IDG to unlock the vehicle. If the check is successful, the control device STE issues an unlock command ERS to the door lock TS in order to unlock the vehicle door TFZ or also other vehicle doors (not shown).

Finally let us look at FIG. 3, in which a flow chart is shown to give a detailed representation of the operation of the access system ZA for controlling access according to an embodiment. If a vehicle, such as the vehicle FZ, is in a switched off or parked state, then in accordance with step S1, at regular intervals or at specific points in time, the vehicle will emit request signals ANS having a specific field strength. Mobile ID transmitters, such as the ID transmitter IDG, can then duly capture these signals, if said transmitters are located within the proximity area ANB, as shown in FIG. 1. First, however, it is assumed that a mobile ID transmitter IDG is still located in position POS1 (outside the proximity area ANB). Now the mobile ID transmitter IDG moves along the arrow P1 toward the vehicle FZ and, in step S2, enters the proximity area ANB, so that its distance to the vehicle is now less or equal to a predetermined distance ANR.

If now in step S3, a further request signal ANS is transmitted by the vehicle or by the send/receive device SE on the vehicle via the antenna ANF, then in step S4 the mobile ID transmitter IDG can receive this signal and will send back a corresponding response signal AWS. Thereby the response signal AWS can contain a short code or an ID transmitter identifier. The response signal AWS emitted by the control device STI and the send/receive device SEI or by the antenna ANI is then received by the antenna ANF and forwarded to the control device STE via the send/receive device SE. The control device STE then checks whether the mobile ID transmitter IDG is assigned to the vehicle FZ and then in step S5 will emit a light control signal LSS to the light control device LSE, so that said light control device LSE activates the lighting device BL, so as to provide an optical signal confirming a successful check for example in the form of "welcome lighting" for the user who is carrying the mobile ID transmitter IDG. However, it is also possible, in addition or alternatively, to provide an acoustic signal, for example by sounding the horn.

Now, in step S6 there begins a more comprehensive authentication, whereby firstly the vehicle FZ sends an authentication request AUS to the mobile ID transmitter IDG via the corresponding devices SE or ANF. In step S7 the mobile ID transmitter IDG responds, whereby a response signal AUW generated by the control device STE is sent back to the vehicle together with an authentication code. Here the response signal AUW is received and routed to the control device STE. Said control device STE checks the authentication code and, after a successful check, will, in step S8, generate an authentication signal BS and send it quasi as the result of a positive check to the mobile ID transmitter IDG via the device SE and ANF. Parallel to that, the control device STE will activate an internal time measuring device or an internal timer IT to measure an unlock time interval ZES. Correspondingly the control device STE will now also await the receipt of an unlock signal from the ID transmitter IDG within the unlock time interval ZES, whereby, after this interval of time has expired, the ID transmitter IDG will no longer accept an unlock signal.

After receipt of the authentication signal BS, the vehicle emits further request signals with a predetermined field strength via the device SE or ANF at regular intervals, as, for example, at intervals of 0.5 s (s: seconds). Thereby, these signals function as distance determining signals ABS for distance determining by the mobile ID transmitter IDG. The emission of the distance determining signals by the vehicle can, for example, be started automatically by the control device STE after or during the forwarding of the authentication signal BS, or it can, as illustrated in step S9, be started by a signal from the mobile ID transmitter IDG by a corresponding start-request SAF to the vehicle FZ. In every case, in accordance with step S10, the distance determining signals ABS are emitted by the vehicle. The mobile ID transmitter IDG knows the field strength or signal field strength with which the distance determining signals ABS are emitted by the vehicle, and measures or determines the field strength of the received distance determining signals ABS at the location of the ID transmitter. In the control device STI, which, as already mentioned above, can be used as a distance determining device, it is possible to determine how far the mobile ID transmitter IDG is from the vehicle FZ from these two values relating to the distance determining signals.

It is assumed that the mobile ID transmitter IDG now moves along the arrow P2 (compare FIG. 1) in the direction of the vehicle to position POS3. By determining the field strength of one or several distance signals of the vehicle captured at this location, the mobile ID transmitter IDG identifies that it is in the unlock proximity area ANBE or that its distance to the vehicle is less or equal to the unlock distance ANRE. Therefore, in step S11, it sends an unlock signal ES to the vehicle FZ. It is to be mentioned here that in this case the unlock signal ES is sent before the unlock time interval has expired and is, therefore, accepted by the vehicle FZ. This unlock signal ES is received by the vehicle and forwarded to the control device STE. It is now possible that a further authentication procedure takes place or that a code that may have been provided in the unlock signal ES is checked by the control device STE. Thereby, it is conceivable that a code is transmitted along with the authentication signal BS to the mobile ID transmitter IDG, which code is then sent back to vehicle FZ in the unlock signal unchanged or altered according to a specific schema. If any authentication that may arise results positive or if the code contained in the unlock signal ES is correct, then, in step S12, the control device will forward the unlock signal to the door lock TS in order to unlock the door TFZ (or several doors of the vehicle).

In order to confirm the unlocking of the door TFZ or of several doors of the vehicle, the control device STE can (as described above with respect to the Welcome Lighting) emit a light control signal LSS to the light control device LSE, so that said light control device LSE activates the lighting device BL, an optical signal for the user who is carrying the mobile ID transmitter IDG, for example by flashing an indicator. However, it is also possible, in addition or alternatively, to provide an acoustic signal, for example by sounding the horn.

In this way it is possible to achieve efficient control of access to a vehicle, whereby a mobile ID transmitter IDG on determining a certain proximity to the vehicle automatically unlocks said vehicle.

It is to be noted that the proximity distance ANR, which identifies the proximity area ANB, can be approximately 1 to 1.5 m, while the unlock distance ANRE, which identifies the unlock proximity area ANBE can be about 0.5 to 0.75 m.

What is claimed is:

1. A method for controlling access to a vehicle, comprising the following steps:
   sending a periodic request signal from the vehicle to a mobile ID transmitter;
   in response to receiving the periodic request signal from the vehicle, the mobile ID transmitter transmitting a response signal including an identifier to the vehicle;
   the vehicle authorizing the mobile ID transmitter based on the identifier received from mobile ID transmitter;
   in response to authorizing the mobile ID transmitter, the vehicle sending an authentication request to the mobile ID transmitter;
   in response to receiving the authentication request from the vehicle, the mobile ID transmitter transmitting an authentication response including an authentication code to the vehicle;
   the vehicle confirming the authentication code received from mobile ID transmitter, and in response, sending an authentication signal to the mobile ID transmitter, with which signal the ID transmitter is authorized to unlock the vehicle;

the mobile ID transmitter determining the distance from the valid mobile ID transmitter to the vehicle;

the mobile ID transmitter determining whether the determined distance is below a predetermined first proximity distance;

in response to determining that the determined distance is below the predetermined first proximity distance, the mobile ID transmitter transmitting an unlock signal from the valid authorized mobile ID transmitter to the vehicle, such that the process for unlocking the vehicle includes at least the three message exchanges of (a) the periodic request signal from the vehicle answered by the response signal from the mobile ID transmitter, (b) the authentication request from the vehicle answered by the authentication response from the mobile ID transmitter, and (c) the authentication signal from the vehicle followed by the unlock signal from the mobile ID transmitter.

2. The method according to claim 1, wherein the vehicle emits the periodic request signal in order to check whether a mobile ID transmitter is located within a second proximity distance that is greater than the first proximity distance.

3. The method according to claim 2, wherein the vehicle, in the event of the check being successful, emits a confirmation signal of the successful check to a user carrying the mobile ID transmitter.

4. The method according to claim 1, wherein the authentication signal is sent directly to the mobile ID transmitter.

5. The method according to claim 1, wherein, in order to determine the distance from the valid mobile ID transmitter to the vehicle the vehicle emits one or several distance determining signals with a predetermined field strength, and on receiving said signals, the valid, mobile ID transmitter determines the distance to the vehicle.

6. The method according to claim 1, wherein, after the authentication signal has been sent, a predetermined unlock time interval for receiving the unlock signal from the mobile ID transmitter begins to be counted down.

7. The method according to claim 6, wherein after the predetermined unlock time interval has expired, the unlock signal is classed as invalid by the vehicle.

8. An access system for a vehicle, comprising:
a send/receive device on the vehicle for:
(a) sending a periodic request signal to a mobile ID transmitter;
(b) sending an authentication request to the mobile ID transmitter after the vehicle authorizes the mobile ID transmitter based on an identifier received from mobile ID transmitter in response to the periodic request signal; and
(c) sending an authentication signal to an mobile ID transmitter, through which signal the ID transmitter is authorized to unlock the vehicle, the authentication signal sent after the vehicle confirms an authentication code received from mobile ID transmitter in response to the authentication request; and
the mobile ID transmitter comprising:
a send/receive device on the ID transmitter; and
a distance determining device for determining the distance between the mobile ID transmitter and the corresponding vehicle;
wherein the send/receive device on the ID transmitter is operable for:
(a) sending a response signal including the identifier to the vehicle, in response to the periodic request signal received from the vehicle;
(b) sending an authentication response including the authentication code to the vehicle, in response the authentication request received from the vehicle; and
(c) sending an unlock signal to the vehicle, after it has received the authentication signal and a distance less than a first predetermined proximity distance has been determined.

9. The access system according to claim 8, wherein the send/receive device on the vehicle is designed to emit the periodic request signal in order to check whether the mobile ID transmitter is located within a second proximity distance that is greater than the first proximity distance.

10. The access system according to claim 8, wherein the send/receive device on the vehicle emits the periodic request signal with predetermined field strength for a distance determination, using which signals the distance determining device of the mobile ID transmitter can determine the distance to the vehicle.

11. The access system according to claim 8, further including a control device on the vehicle, to which the send/receive device on the vehicle routes the received unlock signal, so that the control device on the vehicle unlocks at least one door of the vehicle.

12. The access system according to claim 11, wherein, after sending the authentication signal, the control device on the vehicle is designed to measure a predetermined unlock time interval within which the receipt of the unlock signal is accepted.

13. A car comprising:
an access system with:
a send/receive device on the vehicle for:
(a) sending a periodic request signal to a mobile ID transmitter;
(b) sending an authentication request to the mobile ID transmitter after the vehicle authorizes the mobile ID transmitter based on an identifier received from mobile ID transmitter in response to the periodic request signal; and
(c) sending an authentication signal to an mobile ID transmitter, through which signal the ID transmitter is authorized to unlock the vehicle, the authentication signal sent after the vehicle confirms an authentication code received from mobile ID transmitter in response to the authentication request; and
the mobile ID transmitter comprising:
a send/receive device on the ID transmitter; and
a distance determining device for determining the distance between the mobile ID transmitter and the corresponding vehicle;
wherein the send/receive device on the ID transmitter is operable for:
(a) sending a response signal including the identifier to the vehicle, in response to the periodic request signal received from the vehicle;
(b) sending an authentication response including the authentication code to the vehicle, in response the authentication request received from the vehicle; and
(c) sending an unlock signal to the vehicle, after it has received the authentication signal and a distance less than a first predetermined proximity distance has been determined.

\* \* \* \* \*